(12) United States Patent  
Cho et al.

(10) Patent No.: US 8,716,926 B2
(45) Date of Patent: May 6, 2014

(54) BACKLIGHT UNIT USING ELECTRON EMISSION ELEMENTS AND A DISPLAY APPARATUS HAVING THE SAME

(75) Inventors: Yu-jeong Cho, Suwon-si (KR); Hun-su Kim, Seoul (KR); Bok-chun Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 13/155,783

(22) Filed: Jun. 8, 2011

(65) Prior Publication Data

US 2011/0310611 A1 Dec. 22, 2011

(30) Foreign Application Priority Data

Jun. 17, 2010 (KR) .................. 10-2010-0057590

(51) Int. Cl.
*H01J 61/30* (2006.01)
*H01J 1/02* (2006.01)
*G02F 1/13357* (2006.01)

(52) U.S. Cl.
USPC ............................ 313/495; 313/309; 362/97.1

(58) Field of Classification Search
None
See application file for complete search history.

(56) References Cited

U.S. PATENT DOCUMENTS

2007/0188418 A1* 8/2007 Ohwada et al. .............. 345/75.2
2008/0007154 A1* 1/2008 Wei et al. ..................... 313/497
2008/0030124 A1   2/2008 Ryu

FOREIGN PATENT DOCUMENTS

EP 2063453 A1 5/2009

* cited by examiner

*Primary Examiner* — Ashok Patel
(74) *Attorney, Agent, or Firm* — Sughrue Mion, PLLC

(57) ABSTRACT

A backlight unit includes a first substrate including an anode electrode; and a second substrate including a cathode electrode and an electron emission element, wherein the cathode electrode includes a terminal portion and at least one electrode strip extending from the terminal portion, and the electrode strip includes an electron emission portion on which the electron emission element is mounted and a junction portion which is disposed between the terminal portion and the electron emission portion, and wherein the closer the junction portion is to the terminal portion the greater the width of the junction portion is.

18 Claims, 9 Drawing Sheets

BACKLIGHT UNIT USING ELECTRON EMISSION ELEMENTS AND A DISPLAY APPARATUS HAVING THE SAME

CROSS-REFERENCE TO RELATED APPLICATION

This application claims priority from Korean Patent Application No. 2010-0057590, filed in the Korean Intellectual Property Office on Jun. 17, 2010, the disclosure of which is incorporated herein by reference in its entirety.

BACKGROUND

1. Field of the Exemplary Embodiments

Apparatuses and methods consistent with exemplary embodiments relate to a backlight unit and a display apparatus having the same, and more particularly, to a backlight unit using electron emission elements and a display apparatus having the same.

2. Description of the Related Art

A liquid crystal display (LCD) apparatus, which is a representative display apparatus, comprises a liquid crystal panel which displays images and a back light unit (BLU) which is disposed on a rear surface of the liquid crystal panel and radiates light towards the liquid crystal panel.

A back light unit (BLU) has a light source for generating light. Cold cathode fluorescent lamps (CCFL) and light emitting diodes (LED) have mainly been used as light sources. Recently, new types of back light units which use electron emission elements are being developed.

A back light unit (BLU) using electron emission elements comprises a pair of substrates, that is, a first substrate (upper substrate) and a second substrate (lower substrate). On the lower substrate, a plurality of electron emission elements and cathode electrodes are disposed, whereas on the upper substrate, a fluorescent substance layer and an anode electrode are disposed. When an electric field is formed between the cathode electrodes and the anode electrode, electrons are emitted from the electron emission elements, and as the emitted electrons collide with the fluorescent substance layer, light is generated.

A type of cathode electrode may comprise a terminal portion (dummy) where voltage is applied and a plurality of thin electrode strips which are extended from the terminal portion. During the process of manufacturing a back light unit (BLU) which uses electron emission elements, excitations or cracks may often occur in the area near the electrode strips adjacent to the terminal portion due to a difference between the thermal expansion coefficient of the material of the electrode strips relative to those of other materials. And if such cracks get worse, the electrode strips may break.

A break of the cathode electrodes may act as a fatal defect in the back light unit (BLU), and thus there is a need to resolve this problem.

SUMMARY

Exemplary embodiments provide a back light unit (BLU) capable of preventing break of a cathode electrode and a display apparatus having the same.

An aspect of an exemplary embodiment provides a backlight unit including a first substrate which includes an anode electrode; and a second substrate which includes at least one cathode electrode and at least one electron emission element, wherein the cathode electrode includes a terminal portion and at least one electrode strip extended from the terminal portion, and the electrode strip includes an electron emission portion on which the electron emission element is mounted and a junction portion disposed between the terminal portion and the electron emission portion, and wherein the closer the junction portion is to the terminal portion the greater the width of the junction portion is.

The terminal portion may include at least one penetrating hole.

The junction portion may have a rounded shape at a boundary with the terminal portion.

A barrier layer made of a dielectric material may be disposed on a lower side of the cathode electrode.

The electron emission element may be made of carbon nano-tube.

The second substrate may further include a plurality of partitions arranged in parallel to one another, wherein the at least one electrode strip includes a plurality of electrode strips and one electrode strip is arranged between every two partitions.

The second substrate may further include a plurality of gate electrodes attached to the plurality of partitions.

An aspect of another exemplary embodiment may include a backlight unit including a first substrate which includes an anode electrode; and a second substrate which includes at least one cathode electrode and at least one electron emission element, wherein the cathode electrode includes a terminal portion and at least one electrode strip extended from the terminal portion, and wherein the terminal portion includes at least one penetrating hole.

The electrodes strip may have a rounded shape at a boundary with the terminal portion.

An aspect of another exemplary embodiment may include a first substrate which includes an anode electrode; and a second substrate which includes at least one cathode electrode and at least one electron emission element, wherein the cathode electrode includes a terminal portion and at least one electrode strip extended from the terminal portion, and the electrode strip includes a rounded shape at a boundary with the terminal portion.

An aspect of another exemplary embodiment may include a backlight unit including a first substrate which includes an anode electrode; and a second substrate which includes at least one cathode electrode and at least one electron emission element, wherein the cathode electrode includes a terminal portion and at least one electrode strip extended from the terminal portion, and the electrode strip includes an electron emission portion on which the electron emission element is mounted and a junction portion disposed between the terminal portion and the electron emission portion, and wherein the closer the junction portion is to the terminal portion the greater the width of the junction portion is, the terminal portion has at least one penetrating hole, and the junction portion has a rounded shape at a boundary with the terminal portion.

An aspect of another exemplary embodiment may include a display apparatus including a backlight unit; a display panel which converts light radiated from the backlight unit into an image; and a housing which accommodates the backlight unit and the image panel, wherein the backlight unit includes: a first substrate which includes an anode electrode; and a second substrate which includes at least one cathode electrode and at least one electron emission element, wherein the cathode electrode includes a terminal portion and at least one electrode strip extended from the terminal portion, and the electrode strip includes an electron emission portion on which the electron emission element is mounted and a junction portion disposed between the terminal portion and the electron emission portion, and wherein the closer the junction portion is to the terminal portion the greater the width of the junction portion is.

The terminal portion may have at least one penetrating hole.

The junction portion may have a rounded shape at a boundary with the terminal portion.

An aspect of another exemplary embodiment may include a backlight unit; a display panel which converts light radiated from the backlight unit into an image; and a housing which accommodates the backlight unit and the image panel, wherein the backlight unit includes: a first substrate which includes an anode electrode; and a second substrate which includes at least one cathode electrode and at least one electron emission element, wherein the cathode electrode includes a terminal portion and at least one electrode strip extended from the terminal portion, and the electrode strip includes an electron emission portion on which the electron emission element is mounted and at least one junction portion disposed between the terminal portion and the electron emission portion, and wherein the terminal portion has at least one penetrating hole.

The junction portion may have a rounded shape at a boundary with the terminal portion.

DETAILED DESCRIPTION OF THE EXEMPLARY EMBODIMENTS

Certain exemplary embodiments are described in greater detail with reference to the accompanying drawings.

Figure 1:
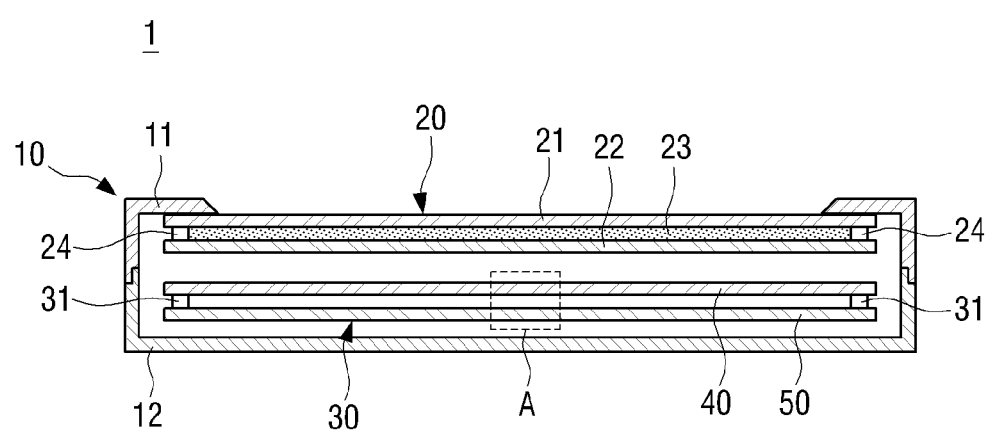
FIG. 1 is a cross-sectional view diagrammatically illustrating a display apparatus according to an exemplary embodiment.

FIG. 1 is a diagrammatic cross-sectional view of a display apparatus according to an exemplary embodiment. However, note that a plurality of constituents which are not directly relevant to the present disclosure are omitted for convenience sake.

With reference to FIG. 1, a display apparatus 1 includes a housing 10, an image panel 20, and a back light unit 30.

The housing 10 accommodates components of the display apparatus including the image panel 20 and the back light unit 30. The housing 10 includes a front housing 11 and a back housing 12. The front housing 11 is shaped to be open to the front for screen exposure, i.e., the front housing 11 includes an opening which exposes a portion of the image panel 20.

The image panel 20 is constituted as a liquid crystal panel. That is, the image panel 20 includes a color filter substrate 21 on which a color filter layer is formed, and a thin film transistor substrate 22 on which a thin film transistor is formed. A space between the two substrates 21, 22 is filled with a liquid crystal layer 23. In addition, the color filter substrate 21 and the thin film transistor substrate 22 are coupled and hermetically sealed by a sealant 24.

In this exemplary embodiment, the image panel 20 is a liquid crystal panel, but in other exemplary embodiments different types of image panels may be applied.

The back light unit 30 which is disposed on a back side of the image panel 20 generates light and radiates the generated light towards the image panel 20. As the light radiated towards the image panel 20 penetrates the liquid crystal layer 23, the volume of light penetrated through the liquid crystal layer 23 is adjusted, and then the penetrated light may be converted into an image having colors by the color filter substrate 21.

As illustrated in FIG. 1, the back light unit 30 includes a first substrate 40 which is an upper substrate, and a second substrate 50 which is a lower substrate. These substrates are hermetically coupled to another by a seal 31.

Figure 2:
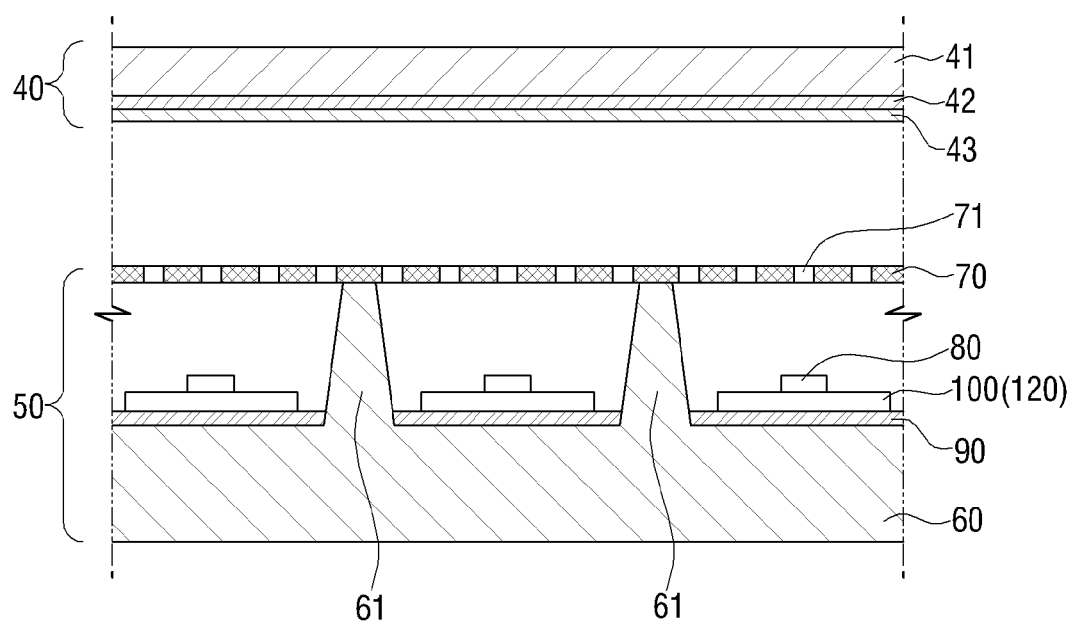
FIG. 2 is an enlarged cross-sectional view of region A in FIG. 1.
Figure 3A:
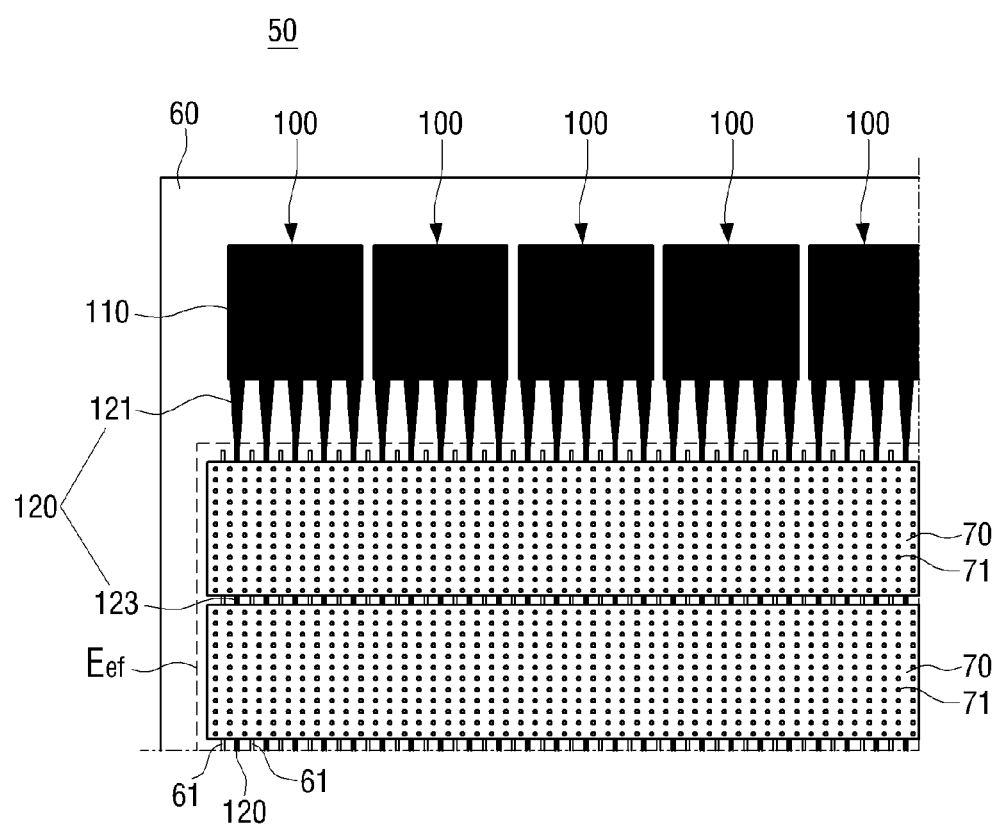
FIGS. 3A and 3B illustrate an area of a second substrate (lower substrate) of the back light unit illustrated in FIG. 1 (in FIG. 3A, gate electrodes are shown, but in FIG. 3B, the gate electrodes are omitted)
Figure 3B:
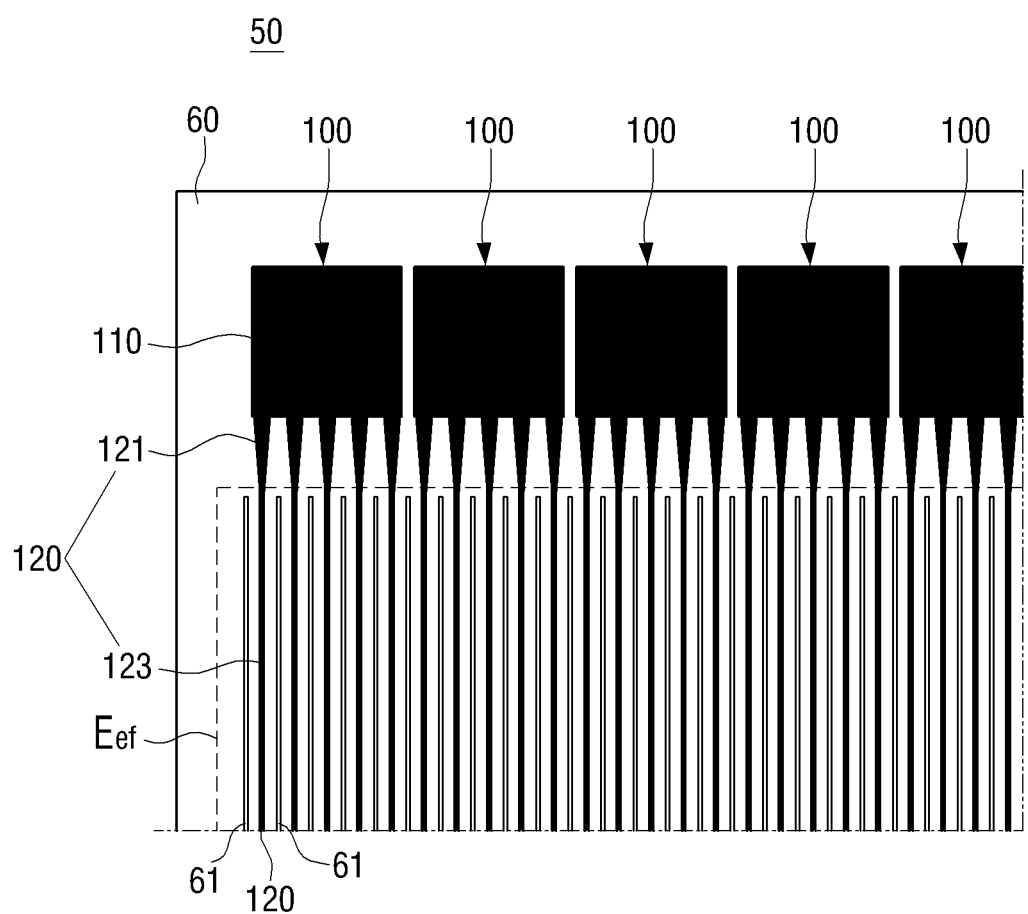

FIGS. 2, 3A, and 3B illustrate the back light unit 30 in greater detail. FIG. 2 is an enlarged view of region A in FIG. 1, and FIGS. 3A and 3B both illustrate a region of the second substrate (lower substrate) of the back light unit illustrated in FIG. 1, except that FIG. 3A shows gate electrodes while FIG. 3B omits the gate electrodes.

With reference to FIG. 2, the first substrate 40 includes a first glass panel 41, a fluorescent substance layer 42 disposed on a lower surface of the first glass panel 41, and an anode electrode 43 disposed on a lower surface of the fluorescent substance layer 42.

The first glass panel 41, the fluorescent substance layer 42 and the anode electrode 43 have in common a shape of a rectangular plate. As a high anode voltage is applied to the anode electrode 43, a potential difference of approximately several dozens kV is formed between the anode electrode 43 and cathode electrodes 100. The fluorescent substance layer 42 generates light as electrons emitted from the second substrate 50 collide with the fluorescent substance layer 42, and the generated light is radiated towards the aforementioned image panel 20.

With reference to FIGS. 2, 3A and 3B, the second substrate 50 includes a second glass panel 60, the cathode electrodes 100 disposed on an upper surface of the second glass panel 60, gate electrodes 70 disposed on an upper side of the cathode electrodes 100, electron emission elements 80 disposed on the cathode electrodes 100, and a barrier layer 90 disposed on a lower side of the cathode electrodes 100.

The second glass panel 60 has a shape of a rectangular plate, and a plurality of partitions 61 are protruded from the upper surface of the second glass panel 60. As illustrated in FIG. 2, the partitions 61 are substantially parallel to one another.

To the cathode electrodes 100, cathode voltages are applied to emit and accelerate electrons. That is, when a cathode voltage is applied to a cathode electrode 100, an electric field is formed between the cathode electrode 100 and the anode electrode 43, and by this electric field, electrons are emitted from the electron emission elements 80 and then accelerated. As illustrated in FIGS. 3A and 3B, on the second glass panel 60, a plurality of cathode electrodes 100 are arranged in parallel to one another. Each cathode electrode 100 includes a terminal portion (dummy) 110 which combines with a flexible printed circuit (FPC, not illustrated) and receives a cathode voltage, and a plurality of thin electrode strips 120 extended from an edge of the terminal portion 110.

In this exemplary embodiment, each cathode electrode 100 includes five electrode strips 120, but there may be other exemplary embodiments wherein each cathode electrode 100 includes less than five or more than five electrode strips 120. As illustrated in FIGS. 3A and 3B, between two partitions 61 one electrode strip 120 is arranged. To be more specific, it can be understood that the cathode electrodes 100 shown in FIG. 2 are the electrode strips 120 of the cathode electrodes 100.

The cathode electrode 100 is made of silver (Ag), and in other exemplary embodiments, the cathode electrode 100 may be made of zinc (Zn), aluminum (Al), or copper (Cu).

The gate electrodes 70 induce electrons to be emitted from the electron emission elements 80 towards the anode electrode 43, wherein carrier voltages are applied to the gate electrodes 70. As illustrated in FIG. 3A, each of the gate electrodes 70 has a shape of a rectangular plate, and is disposed at a right angle to the electrode strips 120 of the cathode electrode 100. As illustrated in FIG. 2, the gate electrodes 70 are supported by the partitions 61 formed on the second glass panel 60. On these gate electrodes 70, numerous electron emission holes 71 each having a diameter of several dozen or hundred μm are formed. Electrons emitted from the electron emission elements 80 may move towards the first substrate 40 through such electron emission holes 71. The gate electrodes 70 are made of aluminum (Al).

As illustrated in FIG. 2, the electron emission elements 80 are mounted on the electrode strips 120 of the cathode electrodes 100. When an electric field is formed between the anode electrode 43 and the cathode electrodes 100, electrons can be emitted from the electron emission elements 80. The electron emission elements 80 are made of carbon nano-tube. In other exemplary embodiments, the electron emission elements 80 may be made of materials which emit electrons when an electric field is formed in a vacuum, for example graphite, graphite nano-fiber, diamond, diamond-like carbon (DLC), fullerene, or silicon nano-fiber. The electrons emitted from the electron emission elements 80 penetrate the gate electrodes 70 and then generate light as they collide with the fluorescent substance layer 42, and the generated light is radiated towards the image panel 20.

Barrier layers 90 are formed between the cathode electrodes 100 and the second glass panel 60. The barrier layers 90 are made of dielectric material, for example, bismuth ($Bi_2O_3$) which is a type of glass.

The gate electrodes 70 made of Al as aforementioned are bonded to the partitions 61 of the second glass panel 60 by the bonding method so called "anobic bonding". Anobic bonding method is as follows: glass generally includes $Na_2O$, and the second glass panel 60 includes more $Na_2O$ than general glass does. In a state where the gate electrodes 70 are disposed on the partitions 61 of the second glass panel 60, a positive voltage is applied to the gate electrodes and a negative voltage is applied to a temporary electrode (not illustrated) which is disposed on a lower side of the second glass panel 60. Then, $Na_2O$ included in the second glass panel 60 is divided into $O^{2-}$ ions and $Na^+$ ions. $Na^+$ ions move towards the temporary electrode whereas $O^{2-}$ ions move towards the gate electrodes 70. Accordingly, in the gate electrodes 70, $O^{2-}$ ions and $Na^+$ ions combine with each other to form $Al_2O_3$. By such a bonding function of $Al_2O_3$, the gate electrodes 70 may be bonded to the partitions 61 of the second glass panel 60.

During such an anodic bonding, $O^{2-}$ ions generated in the second glass panel 60 may oxidize the cathode electrodes 100 or the electron emission elements 80 as they move upwards. That is, in the cathode electrodes 100 made of Ag, $Ag_2O$ may be generated by the combination of $Ag^+$ ions and $O^{2-}$ ions, in which case the function of cathode electrodes 100 as electrodes may decrease as their resistances increase. Meanwhile, in the electron emission elements 80 made of carbon nano-tube material, $CO_2$ may be generated by the combination of carbon and $O^{2-}$ ions, in which case the function of emitting electrons by the electron emission elements 80 may decrease.

The barrier layers 90 prevent oxidation of the cathode electrodes 100 and the electron emission elements 80 as they block the $O^2$ ions generated during the anodic bonding from meeting the cathode electrodes 100 and the electron emission elements 80.

The cathode electrodes 100, the electron emission elements 80 and the barrier layers 90 described above may be manufactured by a forming method called "screen printing". Screen printing refers to a method of penetrating a dough through a screen, and then hardening the molded matter by baking it at a high temperature. Therefore, in a case where the cathode electrodes 100, the electron emission elements 80 and the barrier layers 90 are formed by screen printing, these constituents 100, 80, 90 go through a process of being heated at a high temperature of approximately 450~500° C. and then cooled.

In this process, the cathode electrodes 100 receive stress due to the difference of rates of contraction between the cathode electrodes 100 and the connected electron emission elements 80 or the barrier layers 90. That is, the thermal expansion coefficient of the cathode electrodes 100 is different from the thermal expansion coefficients of the electron emission elements 80 and the barrier layers 90, and thus a great stress may be generated in the cathode electrodes 100 during baking process. If the stress is excessive, excitations or cracks may occur in the cathode electrodes 100, and if the cracks get worse, the electrode strips may break. Of course, the broken cathode electrode 100 cannot function properly as an electrode.

It is highly likely that break of the cathode electrode 100 may occur in the electrode strips 120 near the terminal portion 110, that is, in a junction portion 121 of the electrode trips 120 against the terminal portion 110.

With reference to 3B, the electrode strip 120 includes the junction portion 121 and the electron emission portion 123. If a region in the electron emission elements 80 (see FIGS. 3A and 3B) from which electrons are emitted is to be defined as "effective emission region (Eef)", an electron emission portion 123 can be defined as a part of the electrode strip 120 belonging to, i.e., disposed within, the Eef, and the junction portion 121 of the electrode strip 120 can be defined as a part disposed between the terminal portion 110 and the electron emission portion 123, i.e., disposed outside of the Eef.

The seal 31 between the first substrate 40 and the second substrate 50 as illustrated in FIG. 1 are generally disposed along the edge of the effective emission region (Eef). Based on this feature, an electron emission portion 123 may be defined as a part of the electrode strip 120 disposed on the inner side of the seal 31, and a junction portion 121 may be defined as a part of the electrode strip 120 disposed on the outer side of the seal 31.

Figure 4A:
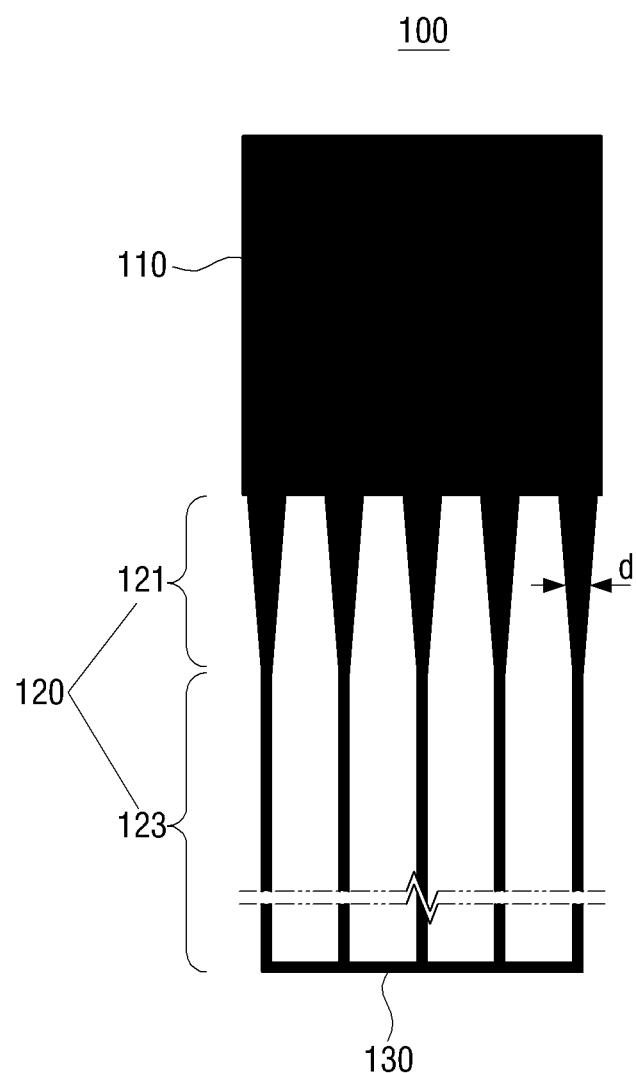
FIGS. 4A to 4E diagrammatically illustrate cathode electrodes according to exemplary embodiments (FIG. 4A is a plan view of a cathode electrode according to a first exemplary embodiment, FIG. 4B is a plan view of a cathode electrode according to a second exemplary embodiment, FIG. 4C is a plan view of a cathode electrode according to a third exemplary embodiment, FIG. 4D is a plan view of a cathode electrode according to a fourth exemplary embodiment, and FIG. 4E is a plan view of a cathode electrode according to a fifth exemplary embodiment).
Figure 4B:
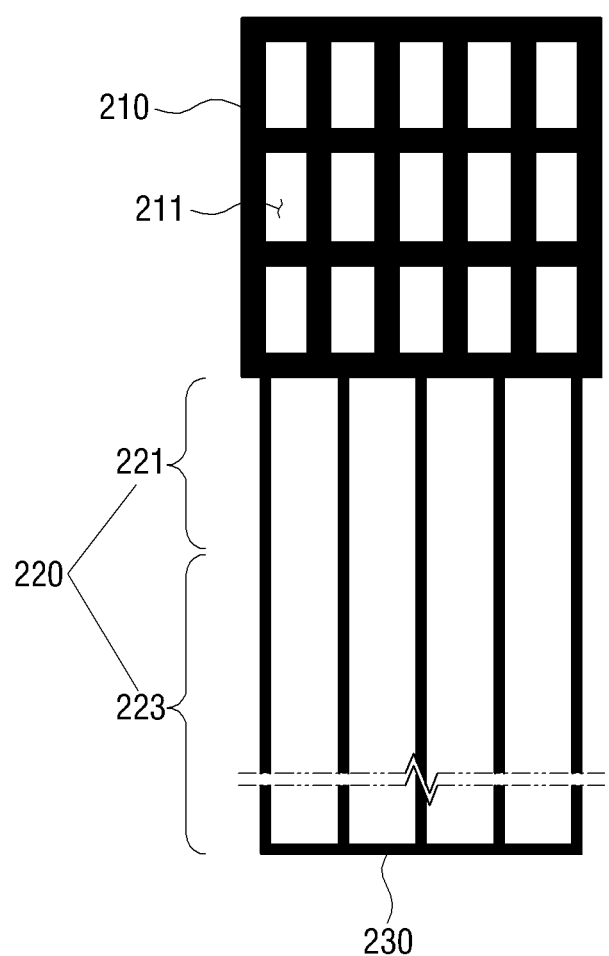
Figure 4C:
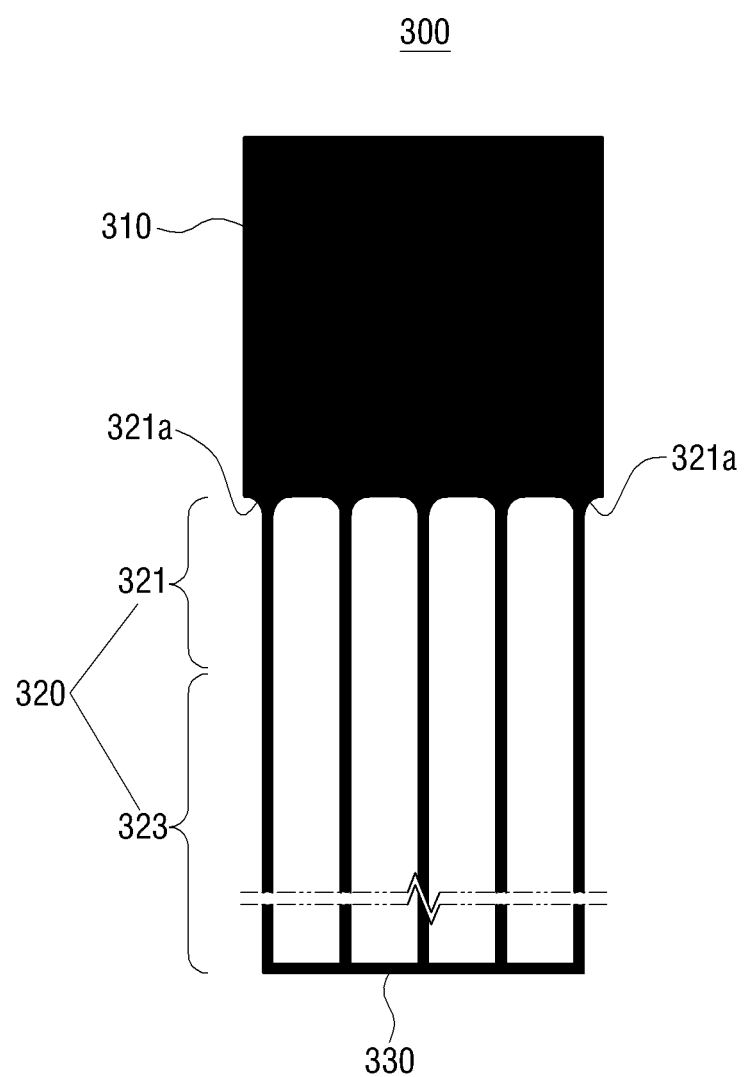
Figure 4D:
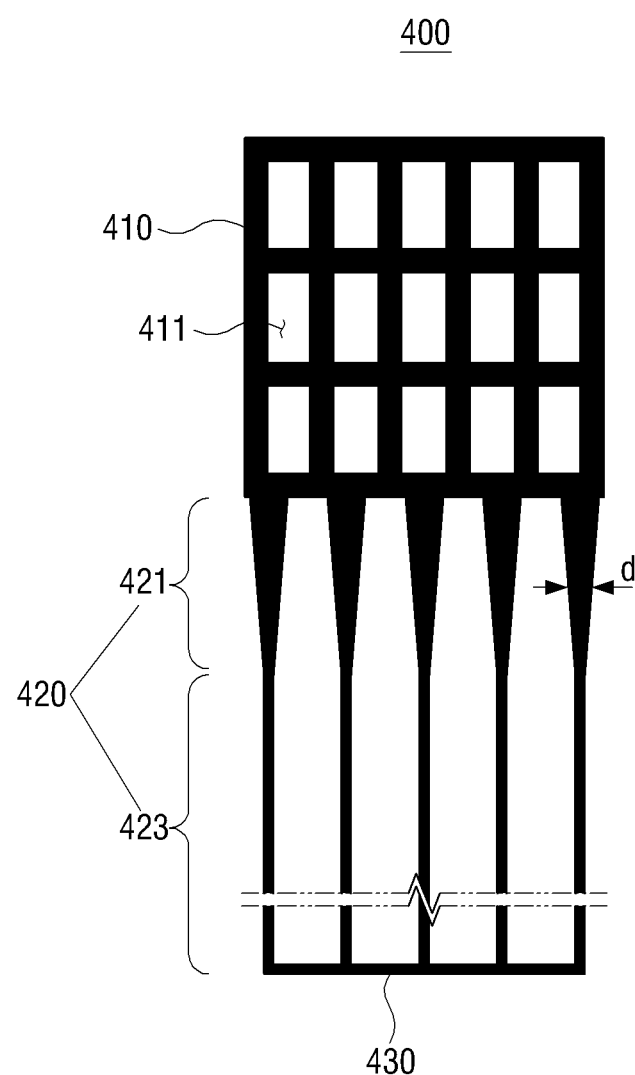
Figure 4E:
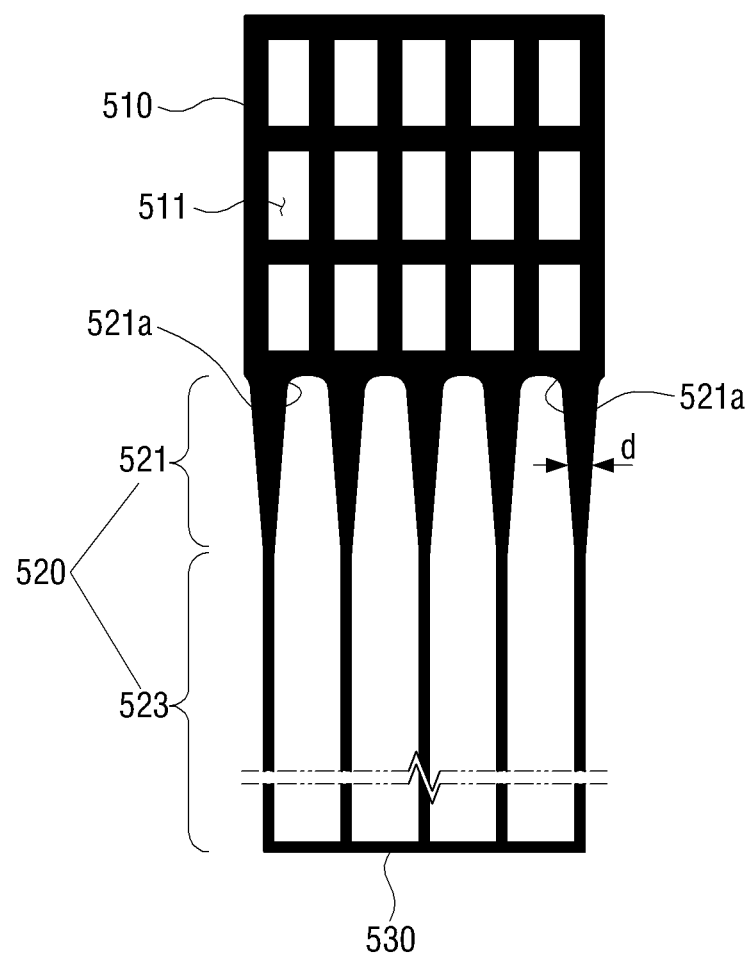

The exemplary embodiments may prevent excitations and cracks and break of lines that may occur in the electrode strips 120. These exemplary embodiments will be explained with reference to FIGS. 4A to 4E. FIGS. 4A to 4E roughly illustrate the alternative embodiments of the cathode electrodes. FIG. 4A is a plan view of a cathode electrode according to a first exemplary embodiment, FIG. 4B is a plan view of a cathode electrode according to a second exemplary embodiment, FIG. 4C is a plan view of a cathode electrode according to a third exemplary embodiment, FIG. 4D is a plan view of a cathode electrode according to a fourth exemplary embodiment, and FIG. 4E is a plan view of a cathode electrode according to a fifth exemplary embodiment.

With reference to FIG. 4A, a cathode electrode 100 according to a first exemplary embodiment includes a terminal portion 110, five electrode strips 120 and a connecting strip 130, each electrode strip 120 comprising a junction portion 121 and an electron emission portion 123. Herein, the connecting strip 130 connects the ends of the electrode strips 120 located in the opposite of the terminal portion 110. When an electrode strip 120 breaks, a cathode voltage may be applied to the broken electrode strip 120 through the connecting strip 130.

As a structure to prevent break of the cathode electrode 100, the cathode electrode 100 according to the first exemplary embodiment has a shape where the closer the junction portion 121 of the electrode strip 120 is to the terminal portion 110 the greater the width d of the junction portion 121. That is, if the electron emitting element 80, the cathode electrode 100, and the barrier layer 90 are substantially in parallel to one another along a plane, the width d of the junction portion 121 of the cathode electrode 100 increases along that plane in a direction toward the terminal portion 110. Such a shape of the connecting unit 121 is based on the fact that the closer a portion is to the terminal portion 110, the higher the possibility that break will occur in the electrode strip 120. However, the widths of the electron emission portions 123 are uniform.

With reference to FIG. 4B, a cathode electrode 200 according to a second exemplary embodiment includes a terminal portion 210, five electrode strips 220 and a connecting strip 230, each of the electrode strip 220 comprising a junction portion 221 and an electron emission portion 223.

As a structure to prevent a break of the cathode electrode 200, the cathode electrode 200 according to the second exemplary embodiment has a plurality of penetrating holes 211 in the terminal portion 210. The numbers, arrangement, and shape of the penetrating holes 211 in FIG. 4B are merely examples. In other alternative embodiments, the penetrating holes 211 may be circular, or arranged irregularly. Due to the penetrating holes 211, the difference of rates of contraction between the terminal portion 210 and the electrode strips 220 may be decreased, and thus the possibility that cracks or breaks may occur in the electrode strips 220 during baking process may be reduced.

With reference to FIG. 4C, the cathode electrode 300 according to the third exemplary embodiment includes a terminal portion 310, five electrode strips 320, and a connecting strip 330, each of the electrode strips 320 comprising a junction portion 321 and an electron emission portion 323.

As a structure to prevent breaks of the cathode electrode 300, the cathode electrode 300 according to the third exemplary embodiment has a shape where parts of the junction portions 321 connected to the terminal portions 310 are rounded. In other words, the junction portions 321 have rounded portions 321A in the boundary with the terminal portion 310. The feature of the junction portions 321 having rounded portions 321A is based on the fact that there is high possibility that break will occur in the boundaries when the terminal portion 310 and the junction portions 321 meet each other vertically. In this exemplary embodiment, since the rounded portions 321A are provided in the junction portions 321, angled regions, specifically sharp corners, in the boundaries of the terminal portion 310 and the connecting units 321 are removed, and thus the possibility of the break in the electrode strips 320 may decrease.

With reference to FIG. 4D, the cathode electrode 400 according to the fourth exemplary embodiment includes a terminal portion 410, five electrode strips 420 and a connecting strip 430, each of the electrode strips 420 comprising a junction portion 421 and an electron emission portion 423.

As a structure to prevent break of the cathode electrode 400, the cathode electrode 400 according to the fourth exemplary embodiment has a shape where the closer the junction portions 421 of the electrode strips 420 are to the terminal portion 410, the wider the width of the junction portions 421, and a plurality of penetrating holes 411 are formed in the terminal portion 410. That is, the cathode electrode 400 according to the fourth exemplary embodiment is a combination of the break preventing structure applied to the first exemplary embodiment and break preventing structure applied to the second exemplary embodiment. Therefore, the prevention of breaking of lines in the cathode electrode 400 may be further reinforced.

With reference to FIG. 4E, the cathode electrode 500 according to the fifth exemplary embodiment includes a terminal portion 510, five electrode strips 520 and a connecting strip 530, each of the electrode strips 520 comprising a junction portion 521 and a electron emission portion 523.

As a structure of preventing break of the cathode electrode 500, the cathode electrode 500 according to the fifth exemplary embodiment has a shape where the closer the junction portion 521 of the electrode strip 520 is to the terminal portion 510 the greater the width of the junction portion 521, and a plurality of penetrating holes 511 are formed in the terminal portion 510, and the junction portions 521 have rounded portions 521A in the boundaries with the terminal portion 510. That is, the cathode electrode 500 according to the fifth exemplary embodiment is a combination of the break preventing structure applied to the second exemplary embodiment and the break preventing structure applied to the third exemplary embodiment. Therefore, the prevention of break of the cathode electrode 500 may be further reinforced.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A backlight unit comprising:
    a first substrate which comprises an anode electrode; and
    a second substrate which comprises at least one cathode electrode and at least one electron emission element,
    wherein the cathode electrode comprises a terminal portion and at least one electrode strip extending from the terminal portion, and the electrode strip comprises an electron emission portion on which the electron emission element is mounted and a junction portion disposed between the terminal portion and the electron emission portion, and
    wherein the closer the junction portion is to the terminal portion the greater the width of the junction portion is.

2. The backlight unit according to claim 1, wherein the terminal portion comprises at least one penetrating hole.

3. The backlight unit according to claim 2, wherein the junction portion has a rounded shape at a boundary with the terminal portion.

4. The backlight unit according to claim 1, wherein the junction portion has a rounded shape at a boundary with the terminal portion.

5. The backlight unit according to claim 1, further comprising a barrier layer comprising a dielectric material disposed on a lower side of the cathode electrode.

6. The backlight unit according to claim 1, wherein the electron emission element comprises carbon nano-tubes.

7. The backlight unit according to claim 1, wherein the second substrate further comprises a plurality of partitions arranged in parallel to one another, and the at least one electrode strip comprises a plurality of electrode strips, and wherein one of the plurality of electrode strips is arranged between every two adjacent partitions.

8. The backlight unit according to claim 7, wherein the second substrate further comprises a plurality of gate electrodes attached to the plurality of partitions.

9. A backlight unit comprising:
a first substrate which comprises an anode electrode; and
a second substrate which comprises at least one cathode electrode and at least one electron emission element,
wherein the cathode electrode comprises a terminal portion and at least one electrode strip extending from the terminal portion, and
wherein the terminal portion comprises at least one penetrating hole.

10. The backlight unit according to claim 9, wherein the electrode strip has a rounded shape at a boundary with the terminal portion.

11. A backlight unit comprising:
a first substrate which comprises an anode electrode; and
a second substrate which comprises at least one cathode electrode and at least one electron emission element,
wherein the cathode electrode comprises a terminal portion and at least one electrode strip extending from the terminal portion, and the electrode strip comprises a rounded shape at a boundary with the terminal portion.

12. A backlight unit comprising:
a first substrate which comprises a fluorescent substance layer and an anode electrode; and
a second substrate which comprises at least one cathode electrode and at least one electron emission element,
wherein the cathode electrode comprises a terminal portion and at least one electrode strip extending from the terminal portion, and the electrode strip comprises an electron emission portion on which the electron emission element is mounted and a junction portion disposed between the terminal portion and the electron emission portion, and
wherein the closer the junction portion is to the terminal portion the greater the width of the junction portion is, the terminal portion has at least one penetrating hole, and the junction portion has a rounded shape at a boundary with the terminal portion.

13. A display apparatus comprising:
a backlight unit;
a display panel which converts light radiated from the backlight unit into an image; and
a housing which accommodates the backlight unit and the image panel,
wherein the backlight unit comprises:
a first substrate which comprises an anode electrode; and
a second substrate which comprises at least one cathode electrode and at least one electron emission element,
wherein the cathode electrode comprises a terminal portion and at least one electrode strip extending from the terminal portion, and the electrode strip comprises an electron emission portion on which the electron emission element is mounted and a junction portion disposed between the terminal portion and the electron emission portion, and
wherein the closer the junction portion is to the terminal portion the greater the width of the junction portion is.

14. The display apparatus according to claim 13, wherein the terminal portion has at least one penetrating hole.

15. The display apparatus according to claim 13, wherein the junction portion has a rounded shape at a boundary with the terminal portion.

16. The display apparatus according to claim 13, wherein the terminal portion has at least one penetrating hole, and the junction portion has a rounded shape at a boundary with the terminal portion.

17. A display apparatus comprising:
a backlight unit;
a display panel which converts light radiated from the backlight unit into an image; and
a housing which accommodates the backlight unit and the image panel,
wherein the backlight unit comprises:
a first substrate which comprises an anode electrode; and
a second substrate which comprises at least one cathode electrode and at least one electron emission element,
wherein the cathode electrode comprises a terminal portion and at least one electrode strip extending from the terminal portion, and the electrode strip comprises an electron emission portion on which the electron emission element is mounted and a junction portion disposed between the terminal portion and the electron emission portion, and
wherein the terminal portion has at least one penetrating hole.

18. The display apparatus according to claim 17, wherein the junction portion has a rounded shape at a boundary with the terminal portion.

* * * * *